(12) United States Patent
Bohn (10) Patent No.: US 8,640,325 B2
(45) Date of Patent: Feb. 4, 2014

(54) METHOD OF CONTINUOUSLY PRODUCING ELECTRONIC FILM COMPONENTS

(75) Inventor: Martin Bohn, Reutlingen (DE)

(73) Assignee: Bielomatik Leuze GmbH & Co.KG, Neuffen (DE)

( * ) Notice: Subject to any disclaimer, the term of this patent is extended or adjusted under 35 U.S.C. 154(b) by 499 days.

(21) Appl. No.: 12/978,603

(22) Filed: Dec. 26, 2010

(65) Prior Publication Data

US 2012/0000065 A1   Jan. 5, 2012

Related U.S. Application Data

(63) Continuation-in-part of application No. 10/588,345, filed as application No. PCT/EP2005/000951 on Feb. 1, 2005, now abandoned.

(30) Foreign Application Priority Data

Feb. 4, 2004  (DE) .......................... 10 2004 006 457

(51) Int. Cl.
*H01Q 17/00*   (2006.01)

(52) U.S. Cl.
USPC ................... 29/601; 29/600; 29/740; 29/832; 29/843; 29/854; 343/878; 156/267; 361/760; 361/765; 361/777

(58) Field of Classification Search
USPC ................... 29/600, 601, 854, 740, 832, 843; 343/878; 156/267; 361/760, 765, 777
See application file for complete search history.

(56) References Cited

U.S. PATENT DOCUMENTS 6,886,246 B2 *   5/2005   Chung ............................ 29/832
6,972,394 B2 * 12/2005   Brod et al. ............... 219/121.85

* cited by examiner

*Primary Examiner* — Peter DungBa Vo
*Assistant Examiner* — Azm Parvez
(74) *Attorney, Agent, or Firm* — Andrew Wilford (57) ABSTRACT

Electronic components each having a chip module with module contacts and an antenna having antenna contacts is made by securing a plurality of the chip modules the inner face of a module film strip having an outer periphery projecting past the chip module with the chip modules spaced from one another at a uniform predetermined module spacing. A plurality of the antennas are secured to an inner face of an elongated antenna strip with the antennas spaced from one another by a predetermined antenna spacing. The module strip is longitudinally subdivided into sections each of which is of a length equal to the predetermined module spacing and each of which carries a respective chip module. The module-strip sections are pressed against the antenna strip such that the module contacts of each of the chip modules engage and bear on the antenna contacts of a respective antenna.

17 Claims, 8 Drawing Sheets

METHOD OF CONTINUOUSLY PRODUCING ELECTRONIC FILM COMPONENTS

CROSS REFERENCE TO RELATED APPLICATIONS

This application is a continuation-in-part of U.S. patent application Ser. No. 10,588,345 filed 3 Aug. 2006 as the US national phase of PCT application PCT/EP2005/000951, filed 1 Feb. 2005, published 18 Aug. 2005 as WO2005/076206, and claiming the priority of German patent application 102004006457.1 itself filed 4 Feb. 2004, whose entire disclosures are herewith incorporated by reference.

FIELD OF THE INVENTION

The invention relates to a method for continuously producing electronic film components in the form of transponders, chip modules via their electrical connecting contacts being placed on antennas of antenna film sections, to a method for continuously is producing electronic film components in the form of chip module labels, to an apparatus for carrying out such a method with a chip module station on which the chip modules are stored as well as an adhesive film station on which the module film strip is fed in the form of a roll, and an electronic film component.

BACKGROUND OF THE INVENTION

A method and an apparatus for continuously producing transponders are known from DE 101 20 269 (U.S. Pat. No. 6,972,394). In the known method, chip modules are held on a support tape. An antenna film strip is provided that has a plurality of antenna film sections arrayed in a row behind each other. Each antenna-film section has antenna connections with which electrical terminals of the chip modules have to be connected. The chip modules are detached from the support tape and at the same time applied to the terminals of the antenna film sections and wound together with the antenna film section. The terminals of the chip modules are connected to the antenna connections by laser soldering. Alternatively it is also possible to connect the terminals of the chip modules with the antenna connections by crimping. The soldering or crimping of the chip modules with the antenna film sections is carried out such that both the electrical connection and the fixed positioning of the chip modules relative to the antenna connections are achieved.

OBJECT OF THE INVENTION

It is the object of the invention to create a method, an apparatus and an electronic film component of the kind mentioned above that with simple means ensure reliable function of the film components.

SUMMARY OF THE INVENTION

Electronic components each having a chip module with module contacts and an antenna having antenna contacts is made by securing a plurality of the chip modules spaced apart in a row to the inner face of an elongated module film strip having an outer periphery projecting past the chip module with the chip modules spaced from one another on the module film strip at a uniform predetermined module spacing. A plurality of the antennas are secured to an inner face of an elongated antenna strip with the antennas spaced from one another by a predetermined antenna spacing. The module strip is longitudinally subdivided into sections each of which is of a length equal to the predetermined module spacing and each of which carries a respective chip module. The module-strip sections are pressed against the antenna strip such that the module contacts of each of the chip modules engage and bear on the antenna contacts of a respective antenna. The outer periphery of each of the module-strip sections is then bonded to the inner face of the antenna strip generally all around each of the chip modules.

For the method for producing transponders, this object is achieved in that the chip modules with their backs facing away from the connecting contacts are applied to module-strip sections, the base surface of which is substantially greater than a base surface of the chip module, that the electrical connecting contacts of the chip modules are electrically contacted with the antenna connections, and that the module-strip sections are connected flat on the surfaces to the antenna film sections such that the chip modules are fixed in their positions relative to the antenna connections. As a result of the solution according to the invention, the chip modules are electrically contacted exclusively with the antenna connections without there having to be a separate fixing of the chip modules relative to the antenna film sections with this contacting. The fixation of the position of the chip modules relative to the antenna film sections is achieved with the module-strip sections that are connected on the surfaces to the antenna film sections around the respective chip module and that fix the chip module in its position to the antenna connections. Consequently, the chip modules are fixed to the respective antenna-film section by the adhesive film section. The chip modules themselves above all assume the function of electrical contacting with the antenna connections, without having it being necessary to also an independently fix their positions by this contacting. Electrical connections can be formed by the mechanical connection of conductive parts of the connecting contacts and the antenna connections or also through a conductive material connection such as soldering, conductive media, for example conductive adhesive, or the like. The module film strip or the corresponding module-strip sections additionally provided compared to the related art not only create a reliably and uniformly fixed position of the chip modules, but at the same time also form a protective film for the chip module and for the electronic film component formed by the chip module and the corresponding antenna film section. The module-strip sections are preferably adjusted to the antenna film sections in terms of their dimensions. Advantageously, the module-strip sections are dimensioned such that in any case an antenna structure of the respective antenna-film section is covered. Each chip module is electrically insulated between the two electrical connecting contacts, so that upon contacting the connecting contacts with the antenna connections no undesirable shorts can be created. This simplifies the production process for the antenna, since the turns of the antenna can be placed on one side (preferably in printed antennas). The antenna connections are also spaced from each other and electrically insulated in the intermediate space. A chip module has a microchip and a module bridge that forms the electrical connecting contacts of the chip module and with which the microchip is conductively connected. For the electrical contacting of the connecting contacts of the chip modules with the antenna connections, the connecting contacts are preferably provided with contact tips that are made either in advance on the module bridges in a separate operation or continuously directly during the method according to the invention. The antenna film sections are preferably formed in that antenna structures are imprinted on a film section, preferably a sheet of paper. Alternatively, the antenna structures can also be formed by etching away the corresponding coatings. The solution according to the invention is particularly suitable for producing transponders that are used as safety labels for packaging, as safety labels for labeling and/or tailoring products and the like. The module film strip forms a cover layer of the electronic film component.

For the method for producing chip module labels, the chip module labels also represent flexible electronic film components, however that have no antenna structures of their own. The chip module labels are preferably applied in a separate, subsequent operation onto surfaces of packaging materials, antenna structures being imprinted on the surfaces or applied otherwise.

In one embodiment of the invention, the antenna film sections are part of an antenna film strip, each antenna-film section having an antenna structure that is applied to the antenna film strip. The antenna structure is preferably imprinted. Alternatively, it can be created by etching.

In another embodiment of the invention, an module film strip that has an adhesive coating on one side is provided continuously with chip modules at uniform spacings, and subsequently the module film strip is divided into individual module-strip sections, each carrying a chip module. In a further embodiment, the division of the module film strip into individual module-strip sections occurs before the electrical contacting of the chip modules with the antenna connections. In both cases, the module-strip sections are conveyed continuously, synchronously with the antenna film strip, such that the connecting contacts of the chip modules are at exactly the same level as the antenna connections of the antenna structures of the antenna film sections. This way, with continuous conveyance of the antenna film strip, exact electrical contacting of the chip modules with the antenna-film section can take place. At the same time, or directly thereafter, the chip modules are fixed in place by pressing the is module-strip sections on the antenna film sections. The module-strip sections are preferably provided with an adhesive coating that is glued to the surface to the antenna film strip. Since the chip modules protrude slightly compared to the antenna film sections, each adhesive film section automatically stretches across the chip module and presses it against the antenna film strip. The module film strip is preferably separated into the individual module-strip sections already after the chip modules have been applied to the module film strip, however prior to contacting the chip modules with the antenna film strip. To this end, preferably rotating cutting tools are provided that divide the module film strip into the individual module-strip sections in a continuous process before the sections are connected to the antenna film sections of the antenna film strip. Particularly with the method for producing the chip module labels, the module film strip may be provided with a punched structure that can be pulled off together with the peel strip after connecting the adhesive film section, sort of in a film-like punched grid.

In a further embodiment of the invention, the contact tips of the electrical connecting contacts of the chip modules are mechanically pressed into the electrically conductive antenna connections. The mechanical connection primarily serves to establish the electrical contacting of the chip modules with the antenna connections. The chip modules are fixed on the antenna film strip—as described above—already by the module-strip sections.

In a further embodiment of the invention, the module film strip and the peel strip are connected across the surfaces thereof and wound in a composite film strip onto a roll, the composite film strip is then unwound from the roll, and the module film strip and the peel strip are pulled away from each other prior to applying the chip modules and fed to different sheet paths. The peel strip forms a support layer for the module film strip and protects the module film strip and the chip modules from damage. At the same time, the peel strip forms the non-adhesive protective layer for the module film strip so as to prevent contamination of the adhesive coating.

In a further embodiment of the invention, the chip modules that have been applied to the antenna film sections of the antenna film strip by means of the module-strip sections, are wound on a roll together with the antenna film strip. This way, simple and reliable storage of the electronic film components can be achieved. It is preferred if the electrical/electronic functions of the film components are verified prior to rolling up the chip modules together with the antenna film strip. This way it is possible to mark film components without functions or transponders with malfunctions in order to be able to sort them in a subsequent step.

In a further embodiment of the invention, the electrical connecting contacts of the chip modules and/or the antenna connections are provided with substantially pyramidal, hard and conductive particles that are oriented such that the tips of the pyramids point in the direction of the corresponding connection. This increases the quality of the electrical contacting, since due to the high pressure present at the tip of the pyramid during a contacting process the tip penetrates into the deforming material of the corresponding connecting partner, thus creating a conductive electrical connection.

In a further embodiment of the invention, prior to the electrical contacting of the electrical connecting contacts of the chip modules with the antenna connections and prior to connecting the module-strip sections to the antenna film sections, an adhesive is applied to the antenna film sections that adhesive following the electrical contacting and the connection forms an adhesive coating, the minimal expansion of which is defined by the boundary surfaces between the chip modules and the antenna film sections and the maximal expansion is defined by the boundary surfaces between the module-strip sections and the antenna film sections. This improves the adhesive force, thus resulting in a more secure fixing of the chip modules relative to the antenna connections.

In a further embodiment of the invention, following the electrical contacting of the electrical connecting contacts of the chip modules with the antenna connections and following the connection of the module-strip sections to the antenna film sections, a support layer, particularly a silicone support layer, is applied to the antenna film sections, and/or a cover layer is applied to the module-strip sections. This way, a film component can be reliably stored in a simple manner and it can be detached from the silicone support layer as needed and be glued, for example, to a packaging material.

For the apparatus for carrying out the method that is provided with a chip module station on which the chip modules are stored, the task underlying the invention is achieved in that an adhesive film station is provided, on which the module film strip is placed in roll form, and in that a transfer station is provided, on which the chip modules are applied with the backs thereof individually to the adhesive surface side of the module film strip, the spacings of the chip modules during application on the module film strip being selected such that an adhesive film section surrounding the associated chip module has a considerably larger surface than the base surface of the respective chip module. Alternatively, either a peel strip is placed, preferably in roll form, on a connecting station or an antenna film strip is placed on an antenna film station. The described solution ensures that the corresponding adhesive film section results in a securely fixed chip module on a peel strip (chip module label) or on the associated antenna-film section (transponder) of the antenna film strip. By feeding the module film strip and the antenna film strip or the peel strip in roll form, it is possible to continuously pull off the sheets from the corresponding rolls. This allows continuous production of the film components. As a result, a large number of corresponding film components can be made in a relatively short time, be it transponders with antenna structures or chip module labels without antenna structures.

The apparatus operates based on the roll-on-roll method and thus allows continuous processing of the individual parts of the film components. According to the invention, the adhesion, and consequently fixation, of the chip modules and the creation of the electrical conductivity between the chip modules and antenna structures are distributed to two different areas. The solution according to the invention is particularly suitable for producing labels with electronic functions, particularly with electronic security or identification functions.

In one embodiment of the invention, a contacting station is provided for the continuous mechanical contacting of the electrical connecting contacts of the chip modules to the antenna connections of antenna film sections of the antenna film strip. On this contacting station, preferably existing contact tips of the connecting contacts of the chip modules are connected to the antenna connections of the antenna film strip. The contacting station is intended for the electrical contacting of the chip modules with the antenna connections.

In a further embodiment of the invention, an adhesion station is provided, on which the module-strip sections protruding beyond the chip modules are connected on the surfaces thereof to the antenna film sections with which the respective chip module is electrically contacted. It is preferred if the adhesion station and the contacting station are integrated in a common unit of the apparatus so as to be able to achieve the electrical contacting and the fixation of the chip modules substantially simultaneously.

In a further embodiment of the invention, the width of the module film strip is greater than a width of the module-strip sections. This way it is possible to provide the module film strip with a punched structure and to remove a corresponding punching grid as a waste product after connecting the module film strip to the peel strip and thus achieve the desired pre-punched and separated module-strip sections.

In a further embodiment of the invention, at least one monitoring station is provided that verifies the function of the transponders. Additionally it may advantageous to provide a marking station in order to be able to mark transponders on which malfunctions were discovered.

In a further embodiment of the invention, a connecting station is provided, on which the antenna film strip, including the chip modules applied thereon and the module-strip sections, are wound onto a roll. This composite roll forms a compact storage roll for the finished electronic film components.

In a further embodiment of the invention, the transfer station has a separating unit for separating the chip modules as well as a turning station for transferring the chip modules with the backs to the module film strip. This way, the chip modules are already placed in the position in which they subsequently have to be applied to the antenna film section.

In a further embodiment of the invention, a separating station is provided for separating the module film strip with the chip modules into separate module-strip sections.

In a further embodiment of the invention, a gluing station is provided where an adhesive is applied to the antenna film strip or the peel strip. It is advantageous if the gluing station is provided in front of the adhesion and contacting station viewed in the sheet conveying direction. Furthermore, it is advantageous if the gluing station controls the application of adhesive such that appropriate adhesive surfaces are only created in the areas of the chip modules on the antenna film strip or the peel strip. This supports the self-adhesive properties of the film strips and thus improves accurate positioning of the chip modules. The partial adhesive application saves adhesive material and prevents the disruptive gluing or contamination of areas that do not require any adhesive application.

In a further embodiment of the invention a support film station is provided, on which the support layer is fed in film form in the wound state.

In a further embodiment of the invention a cover film station is provided, on which the cover layer is fed in film form in the wound state.

In a further embodiment of the invention, a gluing station is provided, on which an adhesive is applied to the cover layer and/or the support layer.

The electronic film component according to the invention can be made with the method according to the invention described above.

BRIEF DESCRIPTION OF THE DRAWING

Additional characteristics and advantages of the present invention will be apparent from the claims and the following description of preferred embodiments of the invention that are illustrated in the drawings.

SPECIFIC DESCRIPTION

Figure 1:
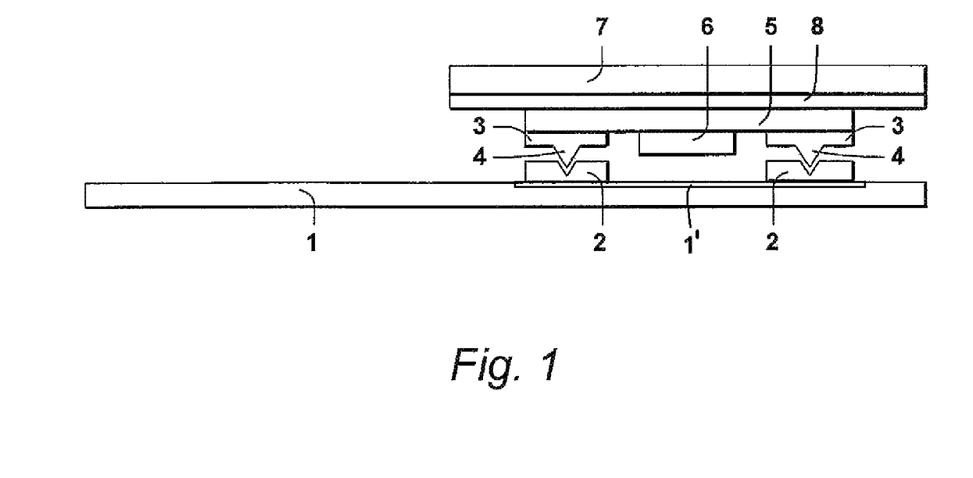
FIG. 1 is a schematic, enlarged sectional view of an electronic film component in the form of a transponder that has been made using an apparatus according to FIG. 2.

FIG. 1 shows a drastically enlarged illustration of an electronic film component that is not to scale. Contrary to the impression that may arise from FIG. 1, the film component is not rigid or dimensionally stable, but rather is flexible. According to FIG. 1, the film component is preferably a flexible film label that is configured as a transponder, for instance usable in an RFID tag.

To this end, an antenna 1' that has two imprinted antenna connections 2 is imprinted on an inner face of a respective short section of an antenna film strip 1. As will be described in more detail hereinafter, the antenna film strip 1 is formed by a succession of the antenna film sections each associated with a respective antenna 1'. The antenna film sections adjoin each other and can be separated by perforations. Alternatively, it is possible to separate the different antenna film sections with suitable cutting or punching tools upon completion of the film components. Perforations allow the antenna film sections to be severed without tools, thus separating the film components. As will be described in more detail hereinafter, the antenna film strip 1 has an inner surface carrying a row of antenna-forming film components arrayed in series on the antenna film strip 1, the components all being configured identically. For a simpler illustration, FIG. 1 therefore only shows one film component by way of example.

Each film component is provided with a chip module 5 that has an electronic semiconductor component 6 and a module bridge. The semiconductor component is preferably a microchip. The corresponding module bridge on the one hand serves to secure the microchip. On the other hand, it establishes an electrical connection with the microchip. For this purpose, the module bridge has electrical contacts 3 on each side of the microchip 6 and provided with contact pins or contact tips 4 that protrude downward to the antenna film strip 1. The contacts 3 of the module bridge of the chip module 5 are spaced identically to the antenna connections 2 such that the connecting contacts 3 are positioned exactly above the antenna connections 2 and are electrically contacted with the antenna connections 2 when the contact tips 4 penetrate into the antenna connections 2. As a result of the electrical contacting of the module bridge with the antenna 1', the desired transponder is made.

Each chip module 5 is held on an adhesive coating 8 carried on an inner face of a respective section of a module film strip 7. Thus, the back of each chip module 5 opposite the respective contact tips 4 is glued to the respective section of the strip 7. The surface area of each of the identical adhesive module-strip sections is substantially larger than the surface area of each of the identical chip modules 5 so that the adhesive module-strip sections overlap the chip module 5 on the outside on all sides. Since each adhesive section of the strip adhesive module-strip sections where it confronts the antenna film strip 1 has a an inner face entirely coated with the adhesive coating 8, every adhesive section of the strip adhesive module-strip sections can be glued around the chip module 5 over its entire surface to the confronting inner face of the antenna film strip 1. This way, the chip module 5 is secured in position on the antenna film strip 1. At the same time, the electrical contacting of the contact tips 4 with the antenna connections 2 is also established. The chip module 5 as well as the imprinted antenna connections 2 of the antennas 1' together have a height of less than 1 mm, so that the resultant film label protrudes minimally even in the area of the chip module 5 or is minimally elevated in relation to the remaining label surface.

The adhesive coating 8 is preferably made with a UV-curable adhesive with a preferred thickness of 20 mm. The module film strip, and therefore also the adhesive section of the strip adhesive module-strip sections, is preferably made of a polyethylene support film that preferably is transparent or opaque and has a preferred thickness of 50 mm. Each chip module 5 thus has an overall thickness of about 70 mm. The thickness of the antenna connections is about 30 mm. The thickness of the antenna film strip 1 is about 70 mm. In a transition region of corresponding antennas 1', the module bridges of the chip modules 5 are preferably provided with an insulating layer in order to prevent short circuits of the antenna sheets.

The chip module may also be applied to a surface of a packaging item that has preferably been provided with an imprinted antenna 1'. For this purpose, a chip module label is made with the apparatus according to FIG. 3.

Figure 2:
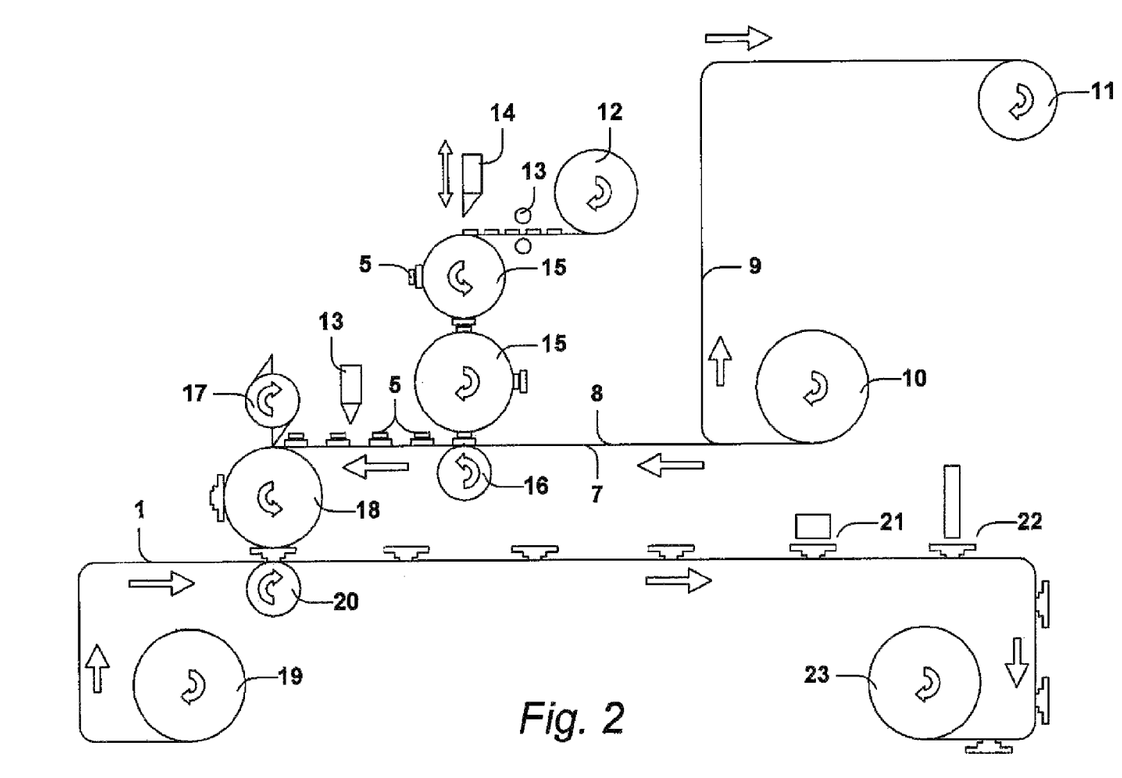
FIG. 2 is a schematic view of an apparatus for continuously producing electronic film components according to FIG. 1.

In order to produce the described electronic film components, according to FIG. 2 a machine is provided that operates continuously in the roll-on-roll method. The machine shown schematically in FIG. 2 is an apparatus for producing electronic film components as defined by the invention. The machine according to FIG. 2 has an adhesive film station 10 where the module film strip 7 that is provided with the adhesive coating 8 on its inner face is wound on a roll. The adhesive coating 8 of the module strip 7 is covered by a removable peel strip 9 formed by a silicone support film in the illustrated embodiment. The module film strip 7 is unwound from the roll such that inner face with the adhesive coating 8 is directed upward. So as to expose the adhesive coating 8, a peel strip 9 is removed and wound onto a support roll 11.

The module film strip 7, together with the adhesive coating 8, travels through a transfer station 14, 15, 16, where the chip modules 5 on are separated and applied to the adhesive coating 8 with the backs facing away from the contact tips 4 and set at a relatively short spacing. The transfer station 14, 15 on which the chain of chip modules 5 is separated and the individual chip modules are applied to the module film strip 7, 7a has a turning station 15 with two deflection rollers rotating in opposite directions in addition to a separating apparatus 14. The chip is modules 5 are initially formed as a chain and pulled from a storage roll 12. When removing the chain of chip modules 5 formed this way, the connecting contacts 3 of each chip module 5 are provided with the contact tips 4 on a contact-preparation or embossing station 13. Thereafter, the chip module chain is separated into individual modules 5 on the separating station 14 that is preferably configured as a cutting tool. The individual chip modules 5 are first entrained by a deflection roller rotating counterclockwise according to the illustration in FIG. 2, the chip modules 5 adhering to the outer surface of the deflection roller. Then, the chip modules 5 are forwarded to a further deflection roller rotating in the opposition direction, i.e. clockwise, of the turning station 15 that is provided beneath the upper deflection roller. The transfer of each chip module 5 from the upper to the lower deflection roller is carried out in a tangential plane region between the two deflection rollers. The lower deflection roller is also provided on the outer circumference with gripper means, preferably vacuum bores of suctions hole, in order to transport the chip modules 5 on the outer surface angularly. By transferring the chip modules 5 from the upper to the lower deflection roller, the chip modules 5 no longer rest with their backs, but instead with their fronts carrying the contact tips 4 directed radially outward of the turning station 15. The peripheral speed of the lower deflection roller 15 is the same as the travel speed of the module film strip 7 such that the chip modules 5 are applied to the module film strip 7 at uniform spacings and are fixed on the adhesive coating 8, these spacings being bigger than the spacings between the modules 5 in the chain on the supply roll 12. The turning station 15 has beneath the module film strip 7 a support roller 16 that conveys the module film strip 7 in a strip-travel direction and at the same time forms a counter-support for pressing the chip modules 5 onto the glue layer 8 on the module film strip 7.

The module film strip 7 with the chip modules 7 is transported to a continuously operating separating apparatus that is configured as a rotating cutting tool 17. It transversely severs the strip 7 between succeeding modules at a so-called module spacing that is still relatively short, but of course greater than the spacing of the modules 5 on the supply roll 12.

Alternatively to the embossing station 13, it is possible to form the contact tips 4 of the electrical connecting contacts 3 of the chip modules 5 only after the chip modules 5 have been applied to the module film strip 7. For this purpose, a metering station 13' is provided that carries out the corresponding production of the contact tips.

In both variations for producing the contact tips, the module film strip 7 with the chip modules 5 applied thereon is separated by the cutter 17 into several module-strip sections each carrying a chip module 5. These are deflected by means of a deflection roller 18 and applied to the antenna film strip 1 by an adhesion and contacting station 18, 20. The antenna film strip 1 is the wound on a storage roll 19 on an antenna film station and is pulled off the storage roll 19 continuously. The antenna film strip 1 has a plurality of antennas 1' arrayed in a row, each with two antenna connections 2. As has been described above, the antenna 1' is imprinted or alternatively etched on the antenna film strip 1. The antennas 1' are provided at uniform spacings from each other on the antenna film strip, this antenna spacing being substantially greater than the overall length of the sections of the strip 7 carrying the modules 5, an effect achieved by rotating the roller 18 at a peripheral speed greater than that of the roller 15 and equal to the travel speed of the strip 7 upstream of the cutter 17.

The module-strip sections as well as the chip modules 5 are applied by the contacting and adhesion station 18, 20 at uniform spacings from each other continuously on the antenna film strip 1 such that the contact tips of each chip module 5 meet exactly with the antenna connections 2 of each antenna printed on the strip 1. The module-strip sections as well as the chip modules are pressed continuously on the continuously passing antenna film strip 1, as a result of which the contact tips 4 cut wedge-like into the antenna connections 2 of the antennas 1' thereon while making the necessary electrical contact. This way, the transponders shown in FIG. 1 are made. At the same time, the corresponding deflection and pressure rollers of the adhesion and contacting station 18, 20 that act on the module-strip sections and the antenna film strip 1 from both sides, are spring-biased against the strips 7 and 7 and have elastomeric outer surfaces so that the module-strip sections are pressed against the adhesive coatings 8 of the respective antenna-strip sections as the chip modules are pushed in. The adhesive coating 8 thus creates a peripheral seal around each module 5 and the respective antenna 1' of the antenna film strip 1 that secures the electrical contacting of the chip modules 5 with the antennas 1'. The schematic illustration according to FIG. 2 does not show that the module-strip sections are connected on the surfaces with the antenna film strip after passing through the adhesion and contacting station 18, 20.

The film components formed and made this way are conveyed on the antenna film strip 1 and pass through a checking station 21 in which the electrical and/or electronic functions of the transponder are tested. Thereafter, the successive row or chain of transponders also passes through a marking station 22 where the film components are marked in terms of a potentially discovered malfunction, particularly by means of ink jet printing. Finally, the chain of film components is wound onto a storage roll of a collecting station 23, this roll being suitable for storage or for further transport of the film components.

Figure 3:
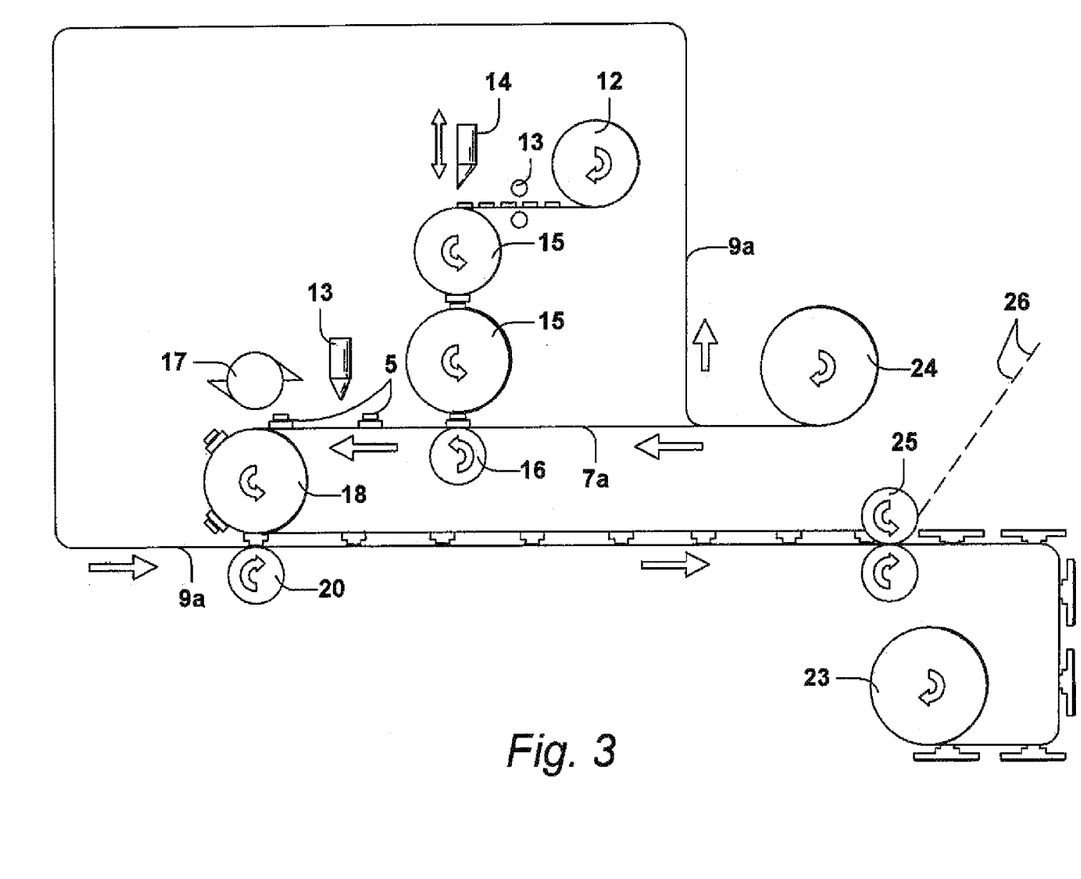
FIG. 3 is a further schematic view of an apparatus for continuously producing electronic film components without antenna structures according to FIG. 1.

In the example according to FIG. 3, all units, components and sheets with identical functions have been assigned identical reference numerals as in FIG. 2. Only the functionally identical module film strip has additionally been assigned the letter "a". A significant difference is that in this example self-adhesive chip module labels without transponder function, i.e. without antennas 1', are made. These chip module labels are applied to surfaces, particularly to surfaces of packages, with corresponding antennas 1' being provided only in a subsequent process that is not shown here.

In the embodiment according to FIG. 3, the peel strip 9a is reused as a support layer for the completed chip module labels. The module film strip 7a and the peel strip 9a are wound in a self-adhesive configuration on a feed roll of a feeding station 24. So as to expose the adhesive coating 8 that is not described in detail of the module film strip 7a, the peel strip 9a is removed directly after unwinding the feed roll of the feeding station 24, is then guided around the system above the chip module station 14-16 and returned as the support layer to the adhesion and contacting station 18, 20. The adhesion and contacting stations in this embodiment only serve for the application of the chip modules to the peel strip 9a, without carrying out any additional electrical contacting function, since there is no antenna film strip.

The turning station 15 that is used to apply the chip modules 5 to the module film strip 7a is configured identically to the embodiment according to FIG. 2, so that it does not need to be described in detail here. Another difference of the embodiment according to FIG. 3 is that the separating apparatus in the form of a rotating cutting tool 17 is disengaged in this embodiment. The module film strip 7a is not divided into individual module-strip sections upstream of the adhesion and contacting stations 18, 20. The module film strip 7a with the chip modules 5 applied thereon rather is maintained as a unit and is deflected around the corresponding deflection roller of the adhesion and contacting station 18, 20 such that the module film strip 7a is conveyed at the same travel speed as the peel strip 9a parallel in the same direction. The chip modules 5 are applied to the module film strip 7a at uniform spacings from each other, so that later they can be removed as chip module labels from the peel strip 9a that is a silicone support film. Furthermore, the module film strip 7a of the peel strip 9a is guided in the area of the adhesion and contacting station 18, 20 such that the chip modules rest on the peel strip 9a with their contact tips. At the same time, the entire module film strip 7a is glued around the chip modules 5 onto the peel strip 9a, thus producing a composite film strip. In the conveying direction, downstream of the adhesion and contacting station 18, a separating station 25 is provided that punches out the module-strip sections of the module film strip 7a by means of rotating punching tool and removes the remaining ladder-shaped waste 26 upward. The punching tool 25 does not touch the peel strip 9a. As a result, the module-strip sections with the chip modules remain on the peel strip 9a, the module-strip sections having a width that is less than that of the module film strip 7a in order to achieve continuous, endless removal of the waste punching grid of the module film strip 7a. This produces the chip module labels held on the peel strip. The finished film components (chip module labels), including the peel strip 9a, are wound onto a storage roll of the connecting station 23. The storage roll made this way has a string of film components in the form of the chip module labels without transponder functions.

Figure 4:
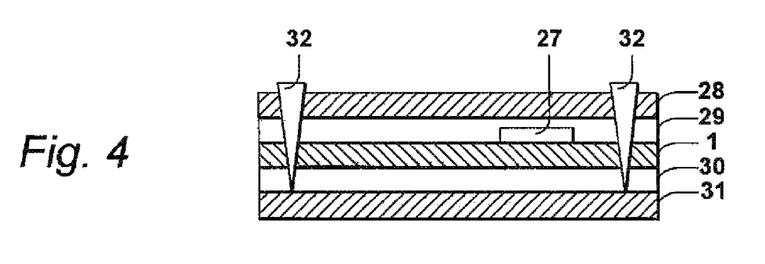
FIG. 4 is a schematic, enlarged sectional view of a further electronic film component in the form of a transponder that has been made using an apparatus according to FIG. 7.
Figures 7, 7A:
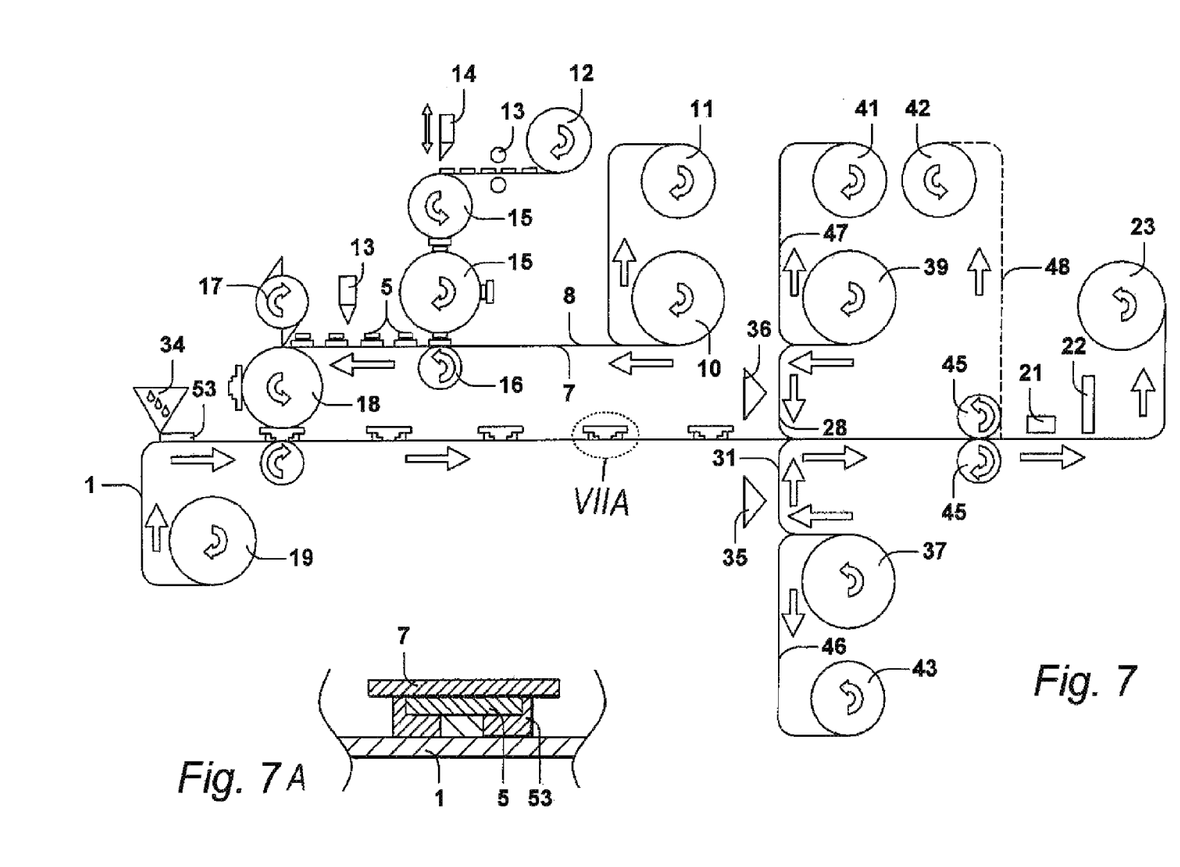
FIG. 7 is a schematic view of a further apparatus for continuously producing electronic film components according to FIG. 4.
FIG. 7A is a large-scale view of the detail indicated at VIIA in FIG. 7.

FIG. 4 shows a considerably enlarged and not-to-scale sectional view of a further electronic film component in the form of a transponder that can be made with an apparatus according to FIG. 7. The combination of chip module 5, the adhesive layer 8, and the section of the strip 7 shown in FIG. 1 has been combined into an intermediate layer element 27. In the example according to FIG. 4, all further elements with identical functions have been assigned identical reference numerals as in FIG. 1. The intermediate element 27 as shown in FIG. 1 is electrically contacted with the antenna connections 2 of an antenna of an antenna-film section of the antenna film strip 1 and fixed in position relative to the antenna connections 2. Furthermore, unlike the film component shown in FIG. 1, a support layer 31 made of silicone and a cover layer 28 are provided that are connected in a material connection with the help of the adhesive coatings 29 and 30 to the top of the antenna film strip 1 and the intermediate layer element 27 and/or a bottom of the antenna film strip 1.

A punching tool 32 that is used to sever all layers except for the support layer 31 during a punching operation is used to separate the different antenna film sections after completion of the film components. Following the punching operation, the film component can be pulled from the support layer 31, the adhesive coating 30 remaining on the removed component, thus making it self-adhesive, allowing it to be applied to a packaging material, for example.

Figure 5:
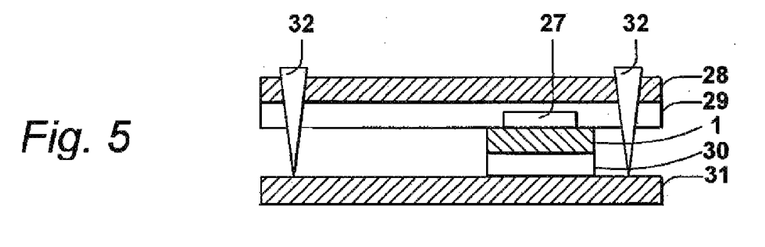
FIG. 5 is a schematic, enlarged sectional view of a further electronic film component in the form of a transponder.

FIG. 5 shows an alternative embodiment of an electronic film component in the form of a transponder that in comparison with the embodiment according to FIG. 4 has a shorter antenna film strip 1 and/or a shorter antenna-film section and a similarly shorter adhesive coating 30. Elements with identical functions have in turn been assigned identical reference numerals.

Figure 6:
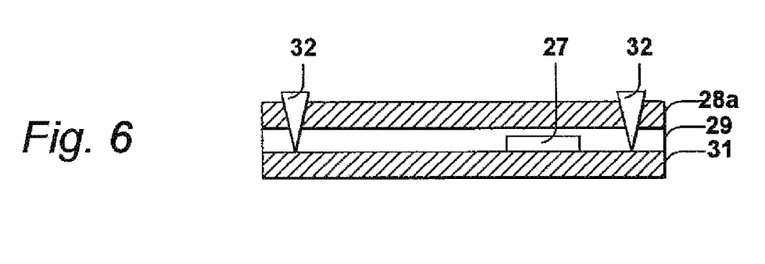
FIG. 6 is a schematic, enlarged sectional view of a further electronic film component in the form of a transponder.

FIG. 6 shows a further alternative embodiment of an electronic film component in the form of a transponder that in comparison with the embodiments according to FIGS. 4 and 5 has two fewer layers. Elements with identical functions have in turn been assigned identical reference numerals. On a side of the cover layer 28a facing the intermediate layer element 27 of the cover layer 28a an antenna is provided that is not shown, but which is again in electrical contact with the intermediate layer element 27. By combining the antenna and cover layers, consequently 2 layers can be saved.

FIG. 7 is a further embodiment of an apparatus for continuously producing electronic film components according to FIG. 4, In addition to the apparatus according to FIG. 2, the apparatus has first to third gluing stations 34 to 36, a support film station 37 on which the sheet-like support layer 31 is fed in film form in the wound state, a cover film station 39 on which the sheet-like cover layer 28 is fed in film form in the wound state, collecting rollers 41 to 43 and a punching station 45. In the example according to FIG. 7, all further elements with identical functions have been assigned identical reference numerals as in FIG. 2.

Prior to the electrical contacting and prior to connecting the adhesive module-strip sections to the antenna film sections in the adhesion and contacting station 18, 20, the first gluing station 34 applies a adhesive 53 (see also FIG. 7A) to the antenna film sections such that following the electrical contacting and the connection an adhesive coating forms between the adhesive module-strip sections and the chip modules 5 on the one hand and the antenna film sections or the antenna film strip 1 on the other hand, the minimal extension of which is defined by the regions between the chip modules 5 and the antenna film sections and the maximal extension of which is defined by the boundary surfaces between the adhesive module-strip sections and the antenna film sections. The adhesive is consequently not applied continuously, but is instead applied in cycles to discrete regions such that the desired local adhesive distribution is achieved. The application of adhesion effected by the first gluing station 34 supports the self-adhesive properties of the adhesive module-strip sections, resulting in improved adhesion and thus a more secure fixation of the chip modules 5 relative to the antenna connections 2.

The support film station 37 is used to feed the sheet-like support layer 31 to the second gluing station 35, where it is provided with the adhesive coating 30 shown in FIG. 4. Thereafter, the support layer 31 with the adhesive coating 30 is connected to the bottom of the antenna film strip 1, thus causing the adhesive coating 30 to create a material connection between the antenna film strip 1 and the support layer 31. For the protection of the support layer 31, the layer is wound together with a protective film or a protective layer 46 in the support film station 37, with the film or layer being removed from the support layer 31 during the feeding process and rolled onto the collecting roller 43.

The cover film station 39 is used to feed the sheet-like cover layer 28 to the third gluing station 36, where it is provided with the adhesive coating 29 shown in FIG. 4. Subsequently, the cover layer 28 comprising the adhesive coating 29 is connected to the top of the antenna film strip 1 and the intermediate layer element 27, a material connection being established by the adhesive coating 29. For the protection of the cover layer 28, the layer is wound together with a protective film or a protective layer 47 in the cover film station 39, with the film or layer being removed from the cover layer 28 during the feeding process and rolled onto the collecting roller 41.

The gluing stations 35 and 36 are optional. If the cover layer 28 and/or the support layer 31 are configured as self-adhesive coatings, the associated adhesive coating 29 and/or 30 that is protected by the protective film and/or protective layer 46 and/or 47, has already been placed on the cover layer 28 and/or the support layer 31 when it is wound on the associated film station 37 and/or 39. The additional application of adhesive by the gluing stations 35 and 36 is consequently no longer required in this case.

After both the support layer 31 and the cover layer 28 have been applied, the resulting layer composite is fed to the punching station 45 that separates all layers with the exception of the support layer 31 by means of the punching tool 32 shown in FIG. 4. A resulting waste punching grid 48 is removed toward the top and wound on the collecting roll 42. The remaining layer composite, i.e. the finished film components and/or transponders, is wound on the storage roll of the connecting station 23 that is suitable for storage or further transport of the film components.

Figure 8:
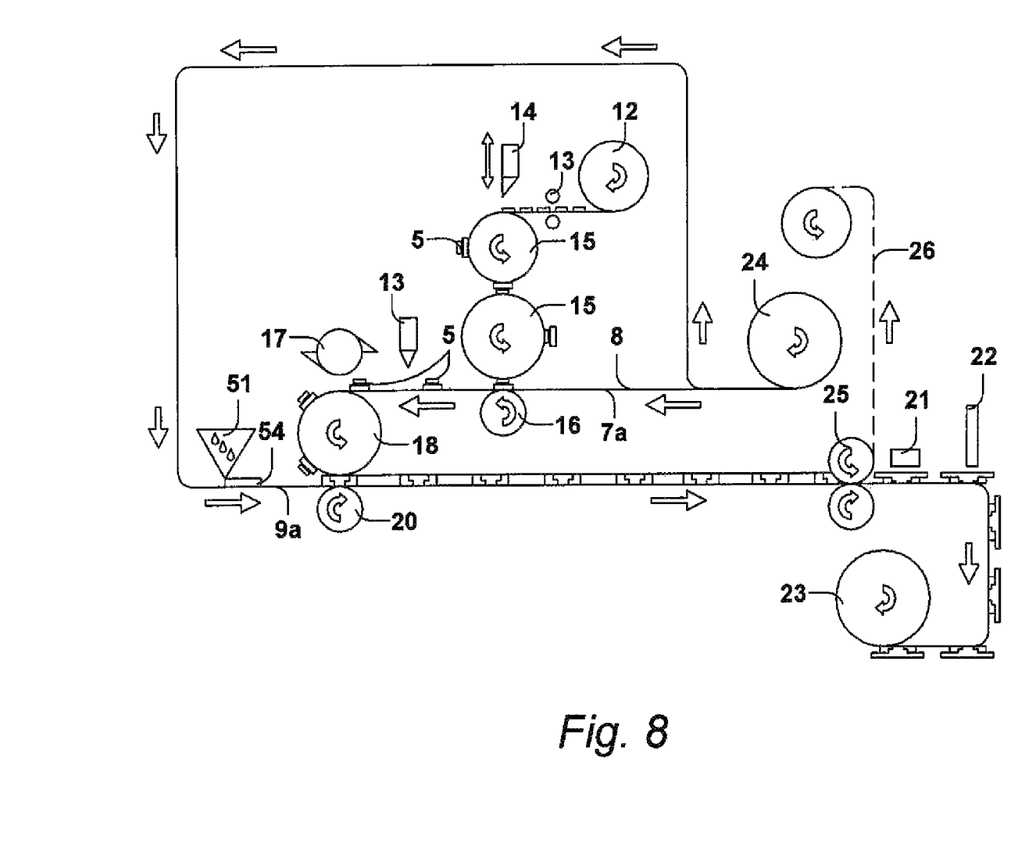
FIG. 8 is a view of a further apparatus for continuously producing electronic film components without antenna structures according to FIG. 1.

FIG. 8 is a further embodiment of an apparatus for continuously producing electronic film components without antennas 1'. In addition to the apparatus according to FIG. 3, the is apparatus has a gluing station 51. In the example according to FIG. 8, all further elements with identical functions have been assigned identical reference numerals as in FIG. 3. Prior to joining the module film strip 7a and the peel strip 9a in the area of the adhesion and contacting station 18, 20, the gluing station 51 is used to apply an adhesive 54 to the peel strip 9a such that an adhesive coating is made in the area of the chip modules 5 are joining the sheets 7a and 9a. The adhesive is consequently not applied continuously, but is instead applied in cycles such that the desired local adhesive distribution is achieved. The application of adhesive effected by the gluing station 51 supports the self-adhesive properties of the peel strip 9a, thus improving adhesion.

Figure 9:
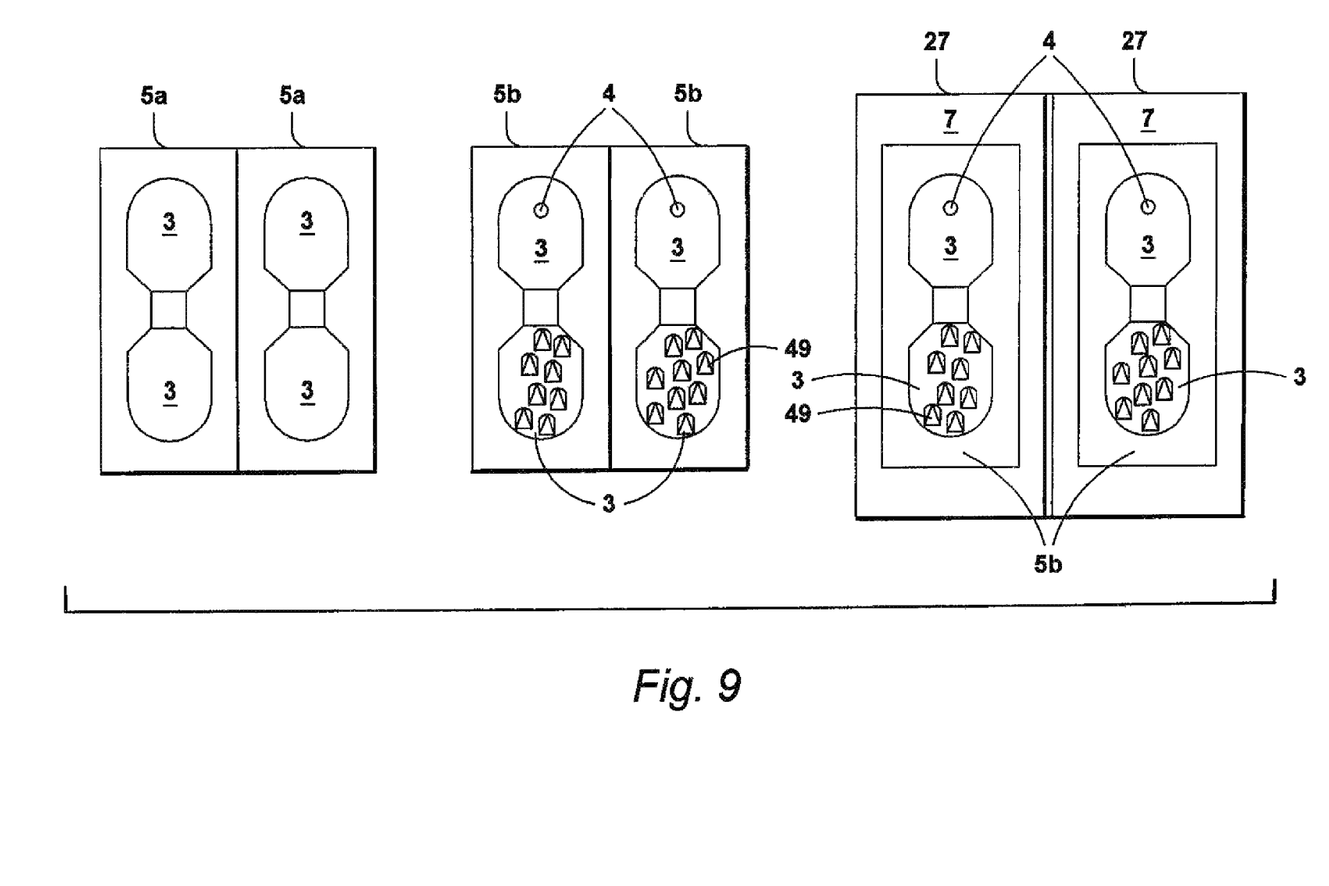
FIG. 9 shows top views of chip modules whose connecting contacts have been processed, as well as module-strip sections to which the processed chip modules have been applied.

FIG. 9 shows top views of unprocessed chip modules 5a, processed chip modules 5b whose connecting contacts 3 have been installed, as well as adhesive module-strip sections, to which the processed chip modules 5b have been applied and/or glued. The unprocessed chip modules 5a are wound, for example, on the chip module station 12 according to FIG. 2 on the storage roll, strung together.

The upper connecting contacts 3 of the chip modules 5b are provided by way of example with contact tips 4 that can be made, for example, by the contact preparation station or embossing station 13 according to FIG. 2. The lower connecting contacts 3 of the chip modules 5b are alternatively provided with substantially pyramidal, hard and conductive particles 49 that are oriented such that the tips of the pyramids point in the direction of the corresponding connection, i.e. the antenna connection. A large base of a particle 49 ideally comes in contact with the connecting contact 3 over its entire surface. To simplify the illustration, only a few particles or pyramids 49 are shown for each connecting contact 3. In fact, however, many, for example several hundred particles 49 are provided for each connecting contact 3. The particles 49 can, for example, be made of nickel-coated diamond dust. The size of the particles typically ranges between 4 mm and 25 mm. If during a contacting operation on the bottom surface a slight pressure builds, a pressure increase results at the tip of the particle 49 that is proportional to the ratio of the surfaces. When the tip of the particle 49 pushes on the corresponding connection, the tip penetrates into the deforming material of the connecting partner and thus creates a conductive electrical connection. The particle 49 is typically already applied during the production of the chip modules 5.

FIG. 9 on the right shows adhesive module-strip sections to which the processed chip modules 5b have already been applied and/or glued. The chip modules 5b, an adhesive coating that is not shown, and the adhesive module-strip sections together form an intermediate layer element 27 according to FIG. 4. The intermediate layer element 27 formed this way can be connected considerably more easily to the antenna film sections than a chip module 5.

Figure 10:
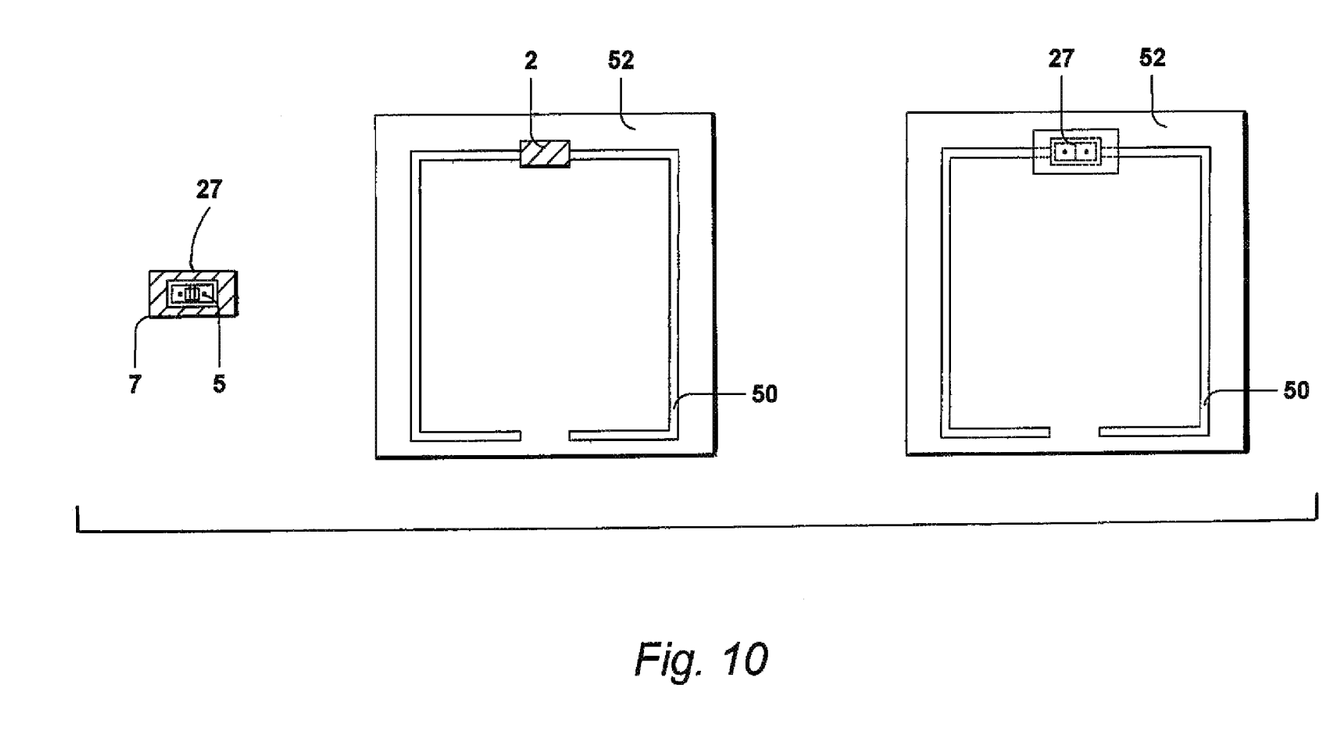
FIG. 10 is an intermediate layer element, an antenna-film section with an antenna as well as the intermediate layer element that has been applied to antenna connections.

FIG. 10 shows top views of such an intermediate layer element 27 of an antenna-film section 52 with an antenna 50 that has the antenna connections 2, as well as the intermediate layer element 27 that has been applied to the antenna connections 2 rotated relative to the view on the left. The connection of the intermediate layer element 27 and antenna-film section 52 already represents a functional transponder that as shown in FIG. 7 now only is given the support and cover layers.

So as to be able to carry out the methods according to the invention, as they are described according to FIGS. 1 to 3, automatically and continuously in the apparatus, a central controller is provided that controls the corresponding stations, tools and speeds of the conveying and deflection rollers. It is also conceivable to monitor the relevant physical variables of the individual functional and apparatuses, including the stations, tools, conveying and deflection rollers, through corresponding sensor units and to transmit corresponding signals or feedback messages to the controller, thus allowing control of the processing and manufacturing procedures of the film components.

I claim:

1. A method of making electronic components each having a chip module with module contacts and an antenna having antenna contacts, the method comprising the steps of:

securing a plurality of the chip modules spaced apart in a row to the inner face of an elongated module film strip having an outer periphery projecting past the chip module with the chip modules spaced from one another on the module film strip at a uniform predetermined module spacing;

securing a plurality of the antennas to an inner face of an elongated antenna strip with the antennas spaced from one another by a predetermined antenna spacing that is longer than the module spacing;

longitudinally subdividing the module strip into sections each of which is of a length equal to the predetermined module spacing and each of which carries a respective chip module and thereafter pressing the module-strip sections against the antenna strip such that the module contacts of each of the chip modules engage and bear on the antenna contacts of a respective antenna; and bonding the outer periphery of each of the module-strip sections to the inner face of the antenna strip generally all around each of the chip modules.

2. The method defined in claim 1 wherein the contacts of the chip module have points so that when pressed against the other contacts they penetrate the other contacts.

3. The method defined in claim 2 wherein the contacts of the chip module are of pyramidal shape.

4. The method defined in claim 3 wherein each pointed contact is formed by a multiplicity of particles.

5. The method defined in claim 4 wherein the particles are nickel-coated diamond particles.

6. The method defined in claim 1, further comprising the steps of releasably mounting the module film strip on a mounting strip;

separating the mounting strip from the module film strip prior to securing thereto the modules; and releasably securing the modules directly to the mounting strip at least after longitudinal subdivision of the film strip.

7. The method defined in claim 6 wherein the modules are releasably secured to the mounting strip before longitudinal subdivision of the module film strip and the longitudinal subdivision of the module film strip is carried out by removing pieces of the module film strip between the modules.

8. The method defined in claim 1, further comprising the step of rolling up the antenna strip after pressing the module-strip sections against the antenna strip.

9. The method defined in claim 8, further comprising, prior to rolling up the antenna strip, the step of inspecting the modules.

10. The method defined in claim 9, further comprising, after inspecting the modules, the step of marking any modules failing inspection.

11. The method defined in claim 1, further comprising the step of releasably adhering a mounting strip to outer faces of the strip sections turned away from the antenna strip and to exposed portions of the antenna strip between adjacent module-strip sections.

12. The method defined in claim 1 wherein the module is associated with two respective module contacts and the module is secured to the film between the two respective contacts.

13. The method defined in claim 1 wherein the film strip is flexible and of plastic.

14. The method defined in claim 1, further comprising the step of releasably adhering a mounting strip to a face of the antenna strip turned away from the module strip.

15. A method of making electronic components each having a chip module with module contacts and an antenna having antenna contacts, the method comprising the steps of:

securing a plurality of the chip modules spaced apart in a row to the inner face of an elongated module film strip having an outer periphery projecting past the chip module with the chip modules spaced from one another on the module film strip at a uniform predetermined module spacing;

securing a plurality of the antennas to an inner face of an elongated antenna strip with the antennas spaced from one another by a predetermined antenna spacing;

longitudinally subdividing the module strip into sections each of which is of a length equal to the predetermined module spacing and each of which carries a respective chip module;

coating the antenna strip with adhesive only to discrete regions of the antenna strip adjacent to the antenna contacts prior to pressing the module-strip sections and their respective modules against the antenna strip;

pressing the module-strip sections against the antenna strip such that the module contacts of each of the chip modules engage and bear on the antenna contacts of a respective antenna; and bonding the outer periphery of each of the module-strip sections to the inner face of the antenna strip generally all around each of the chip modules.

16. The method defined in claim 15 wherein the discrete regions have a size generally corresponding to the module spacing.

17. The method defined in claim 15 wherein the longitudinal subdivision of the module film strip is carried out before pressing the module-strip sections against the respective antennas on the antenna strip and the module spacing is substantially shorter than the antenna spacing.

* * * * *